| United States Patent [19] | [11] | 4,111,859 |
|---|---|---|
| Štrop et al. | [45] | Sep. 5, 1978 |

[54] METHOD OF PREPARATION OF ION EXCHANGERS BY ALKYLATION AND HYDROXYALKYLATION OF POLYMERIC HYDROPHILIC ANION EXCHANGERS

[75] Inventors: Petr Štrop; Jiří Čoupek; Otakar Mikeš, all of Prague, Czechoslovakia

[73] Assignee: Ceskoslovenska akademie ved, Prague, Czechoslovakia

[21] Appl. No.: 548,096

[22] Filed: Feb. 7, 1975

[30] Foreign Application Priority Data

Feb. 13, 1974 [CS] Czechoslovakia .................... 1029-74

[51] Int. Cl.² ........................ B01D 15/04; C08J 5/20; B01D 15/08

[52] U.S. Cl. ........................................ 521/33; 526/23; 526/42; 526/30; 526/55; 526/52.4; 526/304; 526/307; 521/31

[58] Field of Search .............. 260/2.1 E, 80.73, 2.1 R, 260/29.6 TA, 79.3 MO; 526/23, 46, 55, 30

[56] References Cited

U.S. PATENT DOCUMENTS

| 3,220,960 | 11/1965 | Wichterle | 260/29.6 E |
| 3,277,025 | 10/1966 | Glodin et al. | 260/2.1 |
| 3,582,505 | 6/1971 | Jong | 260/2.1 E |
| 3,629,230 | 12/1971 | Soderquist | 260/2.1 R |
| 3,634,394 | 1/1972 | Andreossen | 260/2.1 R |
| 3,699,089 | 10/1972 | Wichterle | 260/80.73 |
| 3,836,512 | 9/1974 | Chu | 260/80.73 |
| 3,850,892 | 11/1974 | Shen et al. | 260/80.75 |

*Primary Examiner*—Joseph L. Schofer
*Assistant Examiner*—Peter F. Kulkosky

[57] ABSTRACT

The invention relates to a method for preparation of ion exchangers from hydrophilic anion-exchanging gels based on acrylate or methacrylate copolymers prepared by copolymerization of amino-group-containing monomers, as aminoalkyl acrylates and methacrylates, aminoalkylacrylamides and aminoalkylmethacrylamides or on gels prepared by chemical bonding of amine groups to the hydrophilic matrix of acrylate or methacrylate copolymers. The method consists in alkylation or hydroxyalkylation of amine groups by alkylating agents, as alkyl halogenides, alkyl p-toluenesulfonates, alkyl sulfates, epoxides, etc. Alkylation with alkyldiaze compounds was used for transformation of the undesired carboxylic groups of the ion exchangers. Another modification consists in the reaction of halogenated acrylate or methacrylate gels with polyamines or oligomeric polyethyleneimines. These reactions lead to ion exchangers with modified chemical nature, dissociation constant, exchange capacity, degree of hydrophility, distance of the ionogenous groups from the surface of the matrix or the character of microsurroundings. The resulting ion-exchanging materials are suitable above all for the sorption and separation of biopolymers.

4 Claims, No Drawings

METHOD OF PREPARATION OF ION EXCHANGERS BY ALKYLATION AND HYDROXYALKYLATION OF POLYMERIC HYDROPHILIC ANION EXCHANGERS

The invention relates to following chemical reactions which modify ionogenous groups or their precursors in hydrophilic chromatographic gels. Hydrophilic carriers of ionogenous groups with modified properties can be prepared by these reactions which extend the possibility for preparation and application of these gels.

Synthetic hydrophilic macroporous ion exchangers according to the Czechoslovak Patent Applications PV 703-74, (Czechoslovak Pat. No. 171,962; U.S. application Ser. No. 545,019) PV 704-74 (Czechoslovak Pat. No. 171,963; U.S. application Ser. No. 545,017) and PV 896-74 (U.S. application Ser. No. 548,094) exhibit in comparison with other types of ion exchangers several important properties which make their application expresively advantageous above all in the region of sorption and chromatography of biopolymers and their high-molecular-weight degradation products. Among these properties are above all the high mechanical stability and chemical resiatance of these compounds as well as the constant volume of the ion-exchanger bed at the changing ionic strength of aqueous solutions. The ability to resist high pressures at the elevated through-flow rates and at a high porosity of the gel is of similar importance.

A condition for the sorption and chromatographic function of these preparations is the presence of suitable ionogenous groups, which were built into the gel already during its preparation by a ternary copolymerization of a hydrophilic monomer with an ionogenous monomer and a crosslinking agent. However, this way is not always the best for preparation of the ion exchanger which possesses optimum properties required for the given special separation problem. It is suitable in some cases to modify the bonded functional groups additionally by a chemical reaction to prepare the derivative with required properties. This occurs especially in the cases, when the polymerization with the unchanged functional group of the monomer is more advantageous than would be the copolymerization of the monomer containing the functional group in the final active form and also in cases when the active functional group has an inhibition effect on the free-radical polymerization or when the additional modification reaction is more economical than preparation of the monomer carrying the final functional group and its copolymerization.

The modification reactions refer above all to such procedures which change the chemical nature, dissociation constant or exchange capacity of ionogenous groups, the degree of hydrophility or the distance from the matrix and the character of the microsurroundings as well as which remove the residues of undesired ionogenous groups present in the anion exchanger. The modification reactions which generate the ion-exchanging groups from the precursor are sometimes more convenient from the standpoint of the ionexchanger preparation itself. It may be achieved by the suitable choice of the precursor, that the formed groups are in the advantageous sterical relations among themselves (alternating copolymerization) which is important for their sorption and chromatographic function. As a rule, the simple transformation of the primary amino group into the secondary or tertiary one leads to a moderate increase of the group basicity and the transformation into the quarternary group increases the basicity very considerably. These properties expressively affect the sorption properties. If the substitution at the amino group is carried out by hydroxyalkylation instead of alkylation, hydrophility of the functional group is increased at the same time, which fact affects the chromatographic properties. The substitution of the amino group by aminoalkylation or alkylaminoalkylation increases its basicity. The exchange capacity of this material increases with the higher number of basic groups and, in addition to this, the additional functional groups may occupy positions more distant from the gel matrix. A suitable selection of substituents may lead to the multiple increase of number of functional groups and enables the groups to occupy positions more distant from the inner surface of pore cavities and to increase the practical exchange capacity for natural polymers. An extended form of these chains is obtained by a natural mutual repulsion of the functional groups which carry coincident charges. Similar reactions may be used for changing the properties of the anion-exchanging functional groups, for extension of their spacer arms and for the required increase of the exchange capacity of the gel.

The modification of the ion-exchanging gel by reactions may be often realized more cheaply than the preparation by the direct copolymerization and the modification often leads to an optimum form for the required purpose. The change of the dissociation constant advantageously affects a sorption characteristics. For example, the rather weakly basic primary amino group in the aminoalkylated derivative does not virtually sorb proteins (haemoglobin, serum albumin), while the material prepared by its additional diethylation sorbs better. However, if the ion-exchanging gel is prepared by copolymerization of diethylaminoethyl methacrylate, it does not sorb haemoglobin, weakly sorbs serum albumin, but well sorbs pepsin. Additional functional groups are formed in the supplemental modification of hydrophilic gels by diethylaminoethylation, which increase the exchange capacity of the gel for proteins having the isoelectric point in an alkaline region. This is confirmed also by the analysis of titration curves and by thermal analyses of the prepared derivatives. It was proved that the copolymer of diethylaminoethyl methacrylate with a hydrophilic comonomer and a crosslinking agent contains only the groups —$CH_2CH_2$—$N(CH_2CH_3)_2$, while all common hydrophilic ion-exchanging derivatives prepared by the polymeranalogous diethylaminoethylation of starch, polydextrans or cellulose contain, besides the weakly basic diethylaminoethyl group, also quarternary ammonium anions which enhance the sorption of proteins. However, the gel alone containing only tertiary amino groups is very suitable for the sorption of proteins which have the isoelectric point in an acidic region, as for example pepsin. It may be therefore used for the sorption of proteins which expressively differ by their isoelectric points. It is obvious from the above given facts, that the subsequent modification of the ionogenous functional groups of the anion exchanger may substantially affect its utilization for separations.

The objective of the invention are modification reactions of hydrophilic polymeric anion exchangers based on gels prepared by copolymerization of acrylate or methacrylate monomers selected from a group of aminoalkyl acrylates, aminoalkyl methacrylates, aminoalkylacrylamides, aminoalkylmethacrylamides or on gels prepared by chemical bonding of amino groups to the hydrophilic matrix of hydroxyacrylate or hydroxymethacrylate copolymers (Czechoslovak Pat. No. 148,828 and 150,809 corresponding to British Pat. Nos. 1,331,087 and 1,370,477 and copending Ser. No. 548,094, now allowed). The action of alkyl halogenides, alkyl p-toluenesulfonates, alkyl sulfates and epoxides is employed in the modification which leads to alkylated and hydroxyalkylated products. If the gels are modified by the reaction with polyamines or oligomeric products of ethyleneimine polyaddition, the resulting anion exchangers may be then readily quaternized by the alkylation reactions and extraordinarily high values of the exchange capacity can be achieved. The content of undesired anionogenous groups in the anion exchanger may be substantially suppressed by alkylation of the carboxylic groups with diazo compounds.

The objective of the invention is further elucidated in examples without, however, limiting the scope of this invention by any means.

EXAMPLE 1

A copolymer of diethylaminoethyl methacrylate with 2-hydroxyethyl methacrylate (2 g), having the molecular weight exclusion limit 700,000, was dispersed in 10 ml of N,N-dimethylformamide and 8 of butyl bromide was added to the mixture. The mixture was shaken occasionally and heated to 150° for 18 hours. The gel was then filtered off, washed with methanol, acetone, water, 20% HCl, water, 10% NaOH, water, 10% HCl, water, methanol, acetone and ether. A reaction with phenolphthalein confirmed quaternization of the original functional tertiary amino groups. Titration was used to prove that the reaction proceeded quantitatively.

EXAMPLE 2

The copolymer used in Example 1 (2 g) which contained 15 mol.% of N,N-diethylaminoethyl functional groups was heated under analogous conditions as in Example 1 with ethyl bromide in a sealed ampoule. The quaternized polymer was washed and then titrated to determine the content of ammonium functional groups.

EXAMPLE 3

A copolymer of ethylene dimethacrylate with 2-hydroxyethyl methacrylate (2 g) was activated with cyanogen bromide and allowed to react with ethylenediamine under conditions described in the Czechoslovak Patent Application PV 2106-72 (Czechoslovak Pat. No. 167,530; British Pat. No. 1,429,534; U.S. application Ser. No. 579,715), Example 17. The gel with bonded primary amino groups was washed and dried and then placed in an ampoule and 5 ml of dioxan with 2 ml of ethylene oxide was added to it. The ampoule was sealed and heated to the temperature 100° C for 5 hours. The reaction product containing hydroxyalkylated tertiary amino groups was quaternized analogously as in Example 2.

EXAMPLE 4

A copolymer of 2-hydroxyethyl methacrylate with ethylene diacrylate (2 g), having the molecular weight exclusion limit 100,000, was modified by a reaction with thionyl chloride (analogously as in the Czechoslovak Patent Application PV 896-74, Example 7). The product was heated to 150° C in a mixture of 5 ml of N,N-dimethylformamide and 3 ml of oligomeric polyethyleneimines having the average molecular weight 370 for 30 hours. The product after cooling and thorough washing was quaternized analogously as in Example 2. The quaternized product was washed with methanol, acetone, water, 10% HCl, water, 10% NaOH, water, methanol, acetone and ether and its exchange capacity was determined (6.5 mequiv/g).

EXAMPLE 5 p/Toluenesulfonyl chloride was crystallized from water, dissolved in chloroform and the chloroform solution was dried with anhydrous $MgSO_4$ and then with the molecular sieve Nalsit A4. Then, p-toluenesulfonyl chloride was refined with active coal and crystallized from chloroform and a mixture chloroform - heptane.

p-Toluenesulfonyl chloride (100 g) was dissolved in 250 ml of dried ether, the solution was cooled to 10° C and then a solution of 80 g of butanol-1 in 100 ml of pyridine was stepwise added in the way that the temperature of the reaction mixture did not exceed 25° C. After the addition was finished, the mixture was further stirred for 5 hours at the laboratory temperature. The conversion was followed by a thin layer chromatography on Silufol UV plates. The almost complete conversion was achieved after 5 hours of stirring. The mixture was then diluted with another 700 ml of ether, the separated precipitate was filtered off, the etheric solution was concentrated to about 400 ml and shaken with aqueous acid of pH 3 as long as pH of the extract did not change. The etheric solution was then shaken twice with 200 ml portions of water, twice with 200 ml of 4% $NaHCO_3$ solution and again twice with 200 ml water, dried, poured through a column with active silicagel and evaporated.

The product, the preparation of which has been described in the preceding paragraph, was added in the amount of 20 g to 2 g of a hydrophilic macroporous gel with 15% of N,N-diethylaminoethyl methacrylate in the polymerization batch. N,N-Dimethylformamide (15 ml) dried with the molecular sieve Nalsit A4 was added to the mixture, which was then heated to 95° C for 5 hours. The gel was then filtered off, washed with dioxan, acetone, benzene, acetone, methanol and water. The portion of 0.5 g was washed and equilibrated with 10% NaOH, washed with water, and the presence of strongly basic groups was proved with phenolphthalein. Another portion was washed with methanol, acetone and ether and the content of sulfur was determined by the elemental analysis.

EXAMPLE 6

A cooled solution of 3 g KOH in 10 ml of water was poured over 20 ml of ether which was cooled below 5° C and 1.5 g of N-methylnitrosourea was gradually added to this mixture so that the temperature did not exceed 10° C. The etheric solution was separated and 5 g of a copolymer of 2-hydroxyethyl methacrylate with ethylene dimethacrylate was added to it, which contained residual carboxylic functional groups (the exchange capacity 0.25 mequiv/g). The suspension was tirred for 30 min, ether was then filtered and the gel washed with methanol, water, 10% HCl, methanol, acetone and ether. The gel was dried and allowed to swell in water. The exchange capacity of carboxylic groups was determined titrimetrically (0.019 mequiv/g).

We claim:

1. In the method for forming polymeric anion exchangers from hydrophilic gels formed from acrylate and methacrylate based copolymers having amino groups, the improvement comprising modifying said gels by subjecting said gels to alkylation agents selected from the group consisting of alkyl halides, alkyl p-toluenesulfonates and epoxides.

2. In the method for forming polymeric anion exchangers from hydrophilic gels formed from monomers selected from the group consisting of aminoalkyl acrylates, aminoalkyl methacrylates, aminoalkyl acrylamides and aminoalkylmethacrylamides, the improvement comprising modifying said gels by subjecting said gels to alkylation agents selected from the group consisting of alkyl halides, alkyl p-toluenesulfonates and epoxides.

3. In the method for forming polymeric anion exchangers from hydrophilic gels formed by the chemical bonding of amino groups to a hydrophilic matrix of acrylate or methacrylate copolymers, the improvement comprising modifying said gels by subjecting said gels to alkylation agents selected from the group consisting of alkyl halides, alkyl p-toluenesulfonates and epoxides.

4. The method according to claim 3, including the step of reacting said acrylate or methacrylate gel with an agent selected from the group consisting of polyamines and an oligomeric product of the poly addition of ethyleneimine.

* * * * *